United States Patent
Grummt

(10) Patent No.: US 8,302,204 B2
(45) Date of Patent: Oct. 30, 2012

(54) SECURE DISTRIBUTED ITEM-LEVEL DISCOVERY SERVICE USING SECRET SHARING

(75) Inventor: Eberhard Oliver Grummt, Dresden (DE)

(73) Assignee: SAP AG, Walldorf (DE)

( * ) Notice: Subject to any disclaimer, the term of this patent is extended or adjusted under 35 U.S.C. 154(b) by 1125 days.

(21) Appl. No.: 12/182,167

(22) Filed: Jul. 30, 2008

(65) Prior Publication Data

US 2010/0031369 A1 Feb. 4, 2010

(51) Int. Cl.
*G06F 17/00* (2006.01)
*G06F 15/16* (2006.01)
*G06F 9/00* (2006.01)
*G06F 7/04* (2006.01)
*G06F 17/30* (2006.01)
*H04N 7/16* (2006.01)

(52) U.S. Cl. ............................................. 726/27; 726/12

(58) Field of Classification Search ........................ None
See application file for complete search history.

(56) References Cited

U.S. PATENT DOCUMENTS

| 2002/0062372 A1* | 5/2002 | Hong et al. .................... 709/225 |
| 2006/0106802 A1 | 5/2006 | Giblin et al. |
| 2007/0033167 A1* | 2/2007 | Basu et al. ........................ 707/3 |
| 2007/0266169 A1* | 11/2007 | Chen et al. .................... 709/231 |

FOREIGN PATENT DOCUMENTS

WO  WO 2005/006663 A1  1/2005

OTHER PUBLICATIONS

European Patent Office; Extended European Search Report dated Jun. 22, 2010; EPO, Rijswijk, Netherlands.

* cited by examiner

*Primary Examiner* — Philip Chea
*Assistant Examiner* — Trong Nguyen

(57) ABSTRACT

A method and a system for a secure distributed item-level discovery service using secret sharing. The discovery service publishes a plurality of uniform resource locators that correspond to a resource identification key on a plurality of servers in a P2P ring. A uniform resource locator (URL) is split in a plurality of shares applying a secret sharing algorithm. For each share of the URL is generated share identifier by applying a hash function to the resource identification key. A share identifier is sent to a target node through a first proxy node applying Peer-to-Peer (P2P) routing. A share of the URL, corresponding to the share identifier is sent to the target node through a second proxy using a network address of the target node. Access rights for reading the share of the URL from the target node are published in an access control node.

18 Claims, 5 Drawing Sheets

SECURE DISTRIBUTED ITEM-LEVEL DISCOVERY SERVICE USING SECRET SHARING

FIELD OF INVENTION

The field of invention relates generally to electronic data processing and more particularly to a discovery service.

BACKGROUND

Search and discovery are critical and integral parts in the today's business information processing. A discovery services (DS) is needed to facilitate finding of information resources in a computer network for particular problems, questions, or even items. Examples of general purpose DS providers are Domain Name System (DNS) service and various Internet search engines. However, there are DS providers aimed to satisfy more specific needs. For example, in a supply chain, a DS would provide references to data for given products or vendors.

Typically, DSs supply references to information resources in a computer network in response to search requests. The search requests contain identification information associated with the required information resources. In the era of globalized economy, DS are especially needed in the public networks, e.g. the Internet. An entity, who wants to avail information resources to third parties, must entrust a DS provider with the respective discovery information, comprising identification information and corresponding references to information resources. Accordingly, the DS provider publishes this information in the public network.

In many cases, the entities that entrust discovery information require from public DS services to control the access to this information. The discovery information, together with some contextual data (e.g. time of publication, number of requests, publisher and requestor network addresses, etc.) can infer sensitive data like business relationships, trade volumes, turnover trends, etc. This fact renders the public DS providers an attractive target for data theft attacks. Furthermore, public DS are susceptible to scalability, availability, and performance problems.

SUMMARY

A method and a system for a secure distributed item-level discovery service using secret sharing are described. The discovery service publishes a plurality of uniform resource locators that correspond to a resource identification key on a plurality of servers in a P2P ring. A uniform resource locator (URL) is split in a plurality of shares by applying a secret sharing algorithm. For each share of the URL is generated share identifier by applying a hash function to the resource identification key. A share identifier is sent to a target node through a first proxy node applying Peer-to-Peer (P2P) routing. A share of the URL, corresponding to the share identifier is sent to the target node through a second proxy applying direct network address routing. Access rules for reading the share of the URL from the target node are published in an access control node.

BRIEF DESCRIPTION OF THE DRAWINGS

A better understanding of the present invention can be obtained from the following detailed description in conjunction with the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
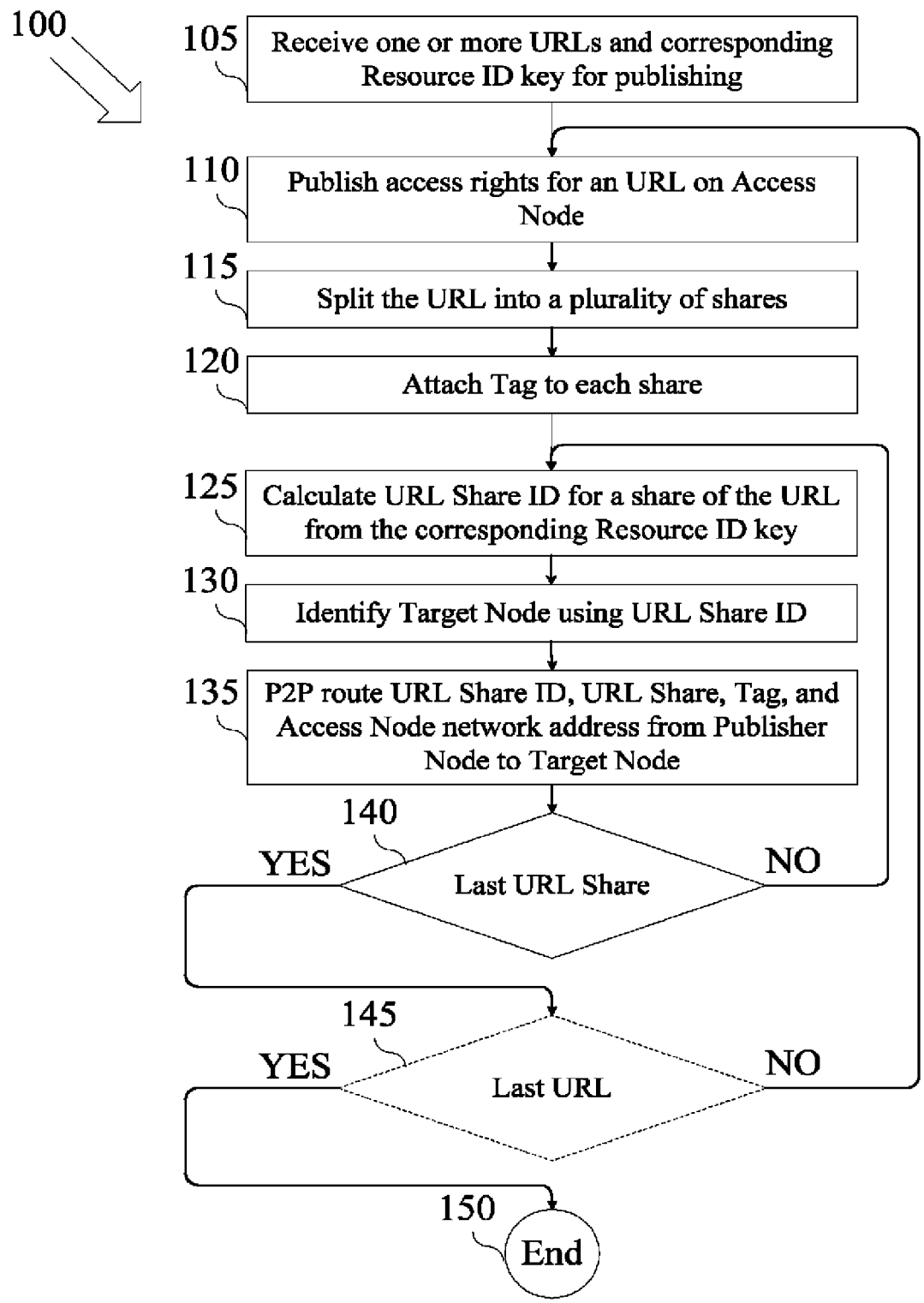
FIG. 1 illustrates a flowchart of a process to publish a plurality of shares of a plurality of URL references to a plurality of target nodes in a P2P ring, according to one embodiment of the invention.

Embodiments of a method and a system for providing secure distributed item-level discovery service using secret sharing are described herein.

A provider of secure discovery services (DSs) in a global computer network publishes a set of uniform resource locators (URLs) that refer to a plurality of network resources, entrusted by a plurality of entities. Further, the provider of secure DSs delivers one or more URLs in response to requests of authorized third parties. According to one embodiment of the invention, each entrusted URL is split in a plurality of shares by applying secret sharing algorithm. Such an algorithm ensures that no part of the URL could be read or decoded without combining all shares. An example for secret share algorithm is Shamir secret sharing. Each share of an URL is published on a different node of the global computer network. This helps to avoid theft of valuable information from a single node, and enhances the scalability and performance. The DS is further secured against revealing any additional or contextual, data that could infer sensitive business information, by applying a P2P routing protocol amongst a plurality of nodes of the global network.

The P2P routing protocol services a plurality of nodes organized in a P2P based network. A P2P based network includes a number of equal peer nodes that simultaneously function as both "clients" and "servers" to each other. In a P2P based network, information or information requests are transferred from a source node to a destination node by passing it amongst a plurality of peer nodes. The destination node receives information or information requests from a peer node and is not aware for the exact P2P route and for the original source node. The exact P2P route of the data transfer depends on the type of the P2P based network.

A P2P network type has to ensure that any source node can efficiently route information or information requests to any destination node. For example, in a distributed hash table (DHT) P2P based network a variant of consistent hashing is applied to assign particular information to each peer node in a way analogous to traditional hash table's assignment of each key to a particular array slot. Thus, a transfer of information or information request is routed amongst a plurality of peers till it reaches the node assigned to this particular information.

Alternative kinds of computer networks are server based networks. A server based network includes a number of nodes that function either as "clients" or "servers", and each node has a network address. In a server based network, information or information requests are transferred from a source node to a destination node by sending it directly to the network address of the destination node. The exact route of the transfer depends on the network topology and is predetermined by the network addresses of the source node and the destination node. In general, the destination node receives information or information requests together with data for the exact route of the transfer, including the network address of the source node.

The existing public global networks, like the Internet, are classified as server based networks. Each node in such a network has a global or absolute network address, which enables efficient and universal data exchange. However, on top of a server based network, it is possible to establish a P2P based network. A P2P based network in this context means a number of nodes serviced by a P2P protocol. One embodiment of the invention utilizes a P2P based network built upon an underlying server based global network. As used herein, the term "network" means a global server based network, e.g. the Internet, and the term "P2P ring" means a P2P based network built upon the global network. P2P ring includes a subset of nodes from the network, where each node has a network address, but this address is not applied in a P2P routing. As used herein, the term "network address" and "network location" means an absolute network address of a node in the global network. A network node is any type of active device in a network that has a network address, like a workstation, server, or simply a router.

FIG. 1 is a flowchart 100 of one embodiment of a process to publish a plurality of shares of a plurality of URL references to a plurality of target nodes in a P2P ring by a secure DS provider. Certain operations of the process are represented by boxes with dashed lines to illustrate that they are optional. The secure DS provider operates in a global network and utilizes a plurality of network nodes in a DHT based P2P ring. At block 105, the DS provider receives a resource identification key and one or more corresponding URLs at a publishing node. If the access to the URLs has to be controlled, a set of corresponding access rules may be defined for every single URL and published on an access node at block 110. Alternatively, the access rules may be defined for all URLs corresponding to one resource identification key, and published together.

At block 115, one of the received URLs is split in a predefined number of parts or shares. In one embodiment, the shares are generated using a Shamir secret sharing algorithm. At block 120, a special tag is attached to each share of the URL to indicate that these shares belong to a same URL. This is done when more than one URL corresponds to a single resource identification key. Then, at block 125, the DS provider calculates a share identifier for one of the shares of the URL by applying the underlying hash function of the DHT based P2P ring to the resource identification key. At block 130, a target node is identified in the DHT corresponding to the share identifier. The target node is the node, where the share identifier and the URL share are to be published. The share identifier and the URL share are transferred from the publisher node to the target node by applying a P2P routing protocol at block 135.

Blocks 125 through 135 repeat to store each share of the URL to a separate target node in the P2P ring. The resource identification key is modified each time the hash function is applied in order to receive unique share identifier for each URL share. No single target node will have all parts of the URL and the URL will be secured against data theft attacks. At block 140, it is determined if there are any shares of the URL left to be published. Blocks 110 through 140 repeat for each URL corresponding to the resource identification key. At block 145, it is determined if there are any URL corresponding to the resource identification key left unpublished. The process ends at block 145 when all shares of all received URLs are published on a plurality of target nodes in a P2P ring.

Alternatively, instead of repeating the actions of blocks 110 through 140, all received URLs corresponding to a single resource identifier key may be split in a predefined number of shares simultaneously at block 115. Thus a share identifier calculated at block 125 will correspond to a set of shares of different URLs, and the whole set of shares for the different URLs will be published to a corresponding target node at block 135.

P2P routing of shares and share identifiers prevents revealing of network addresses of the nodes that exchange the data. Furthermore, the secure sharing of the URL prevents hindering sensitive data, like for example, the dynamics of the relationships between a publishing entity and an information requester. However, during the P2P routing, some peer nodes, other than the publisher node and target nodes, will handle the shares and the share identifiers pairs, and, potentially, evaluate these pairs illicitly. To prevent this, in one embodiment of the invention, a DS provider publishes the shares and the corresponding share identifiers separately.

Figure 2A:
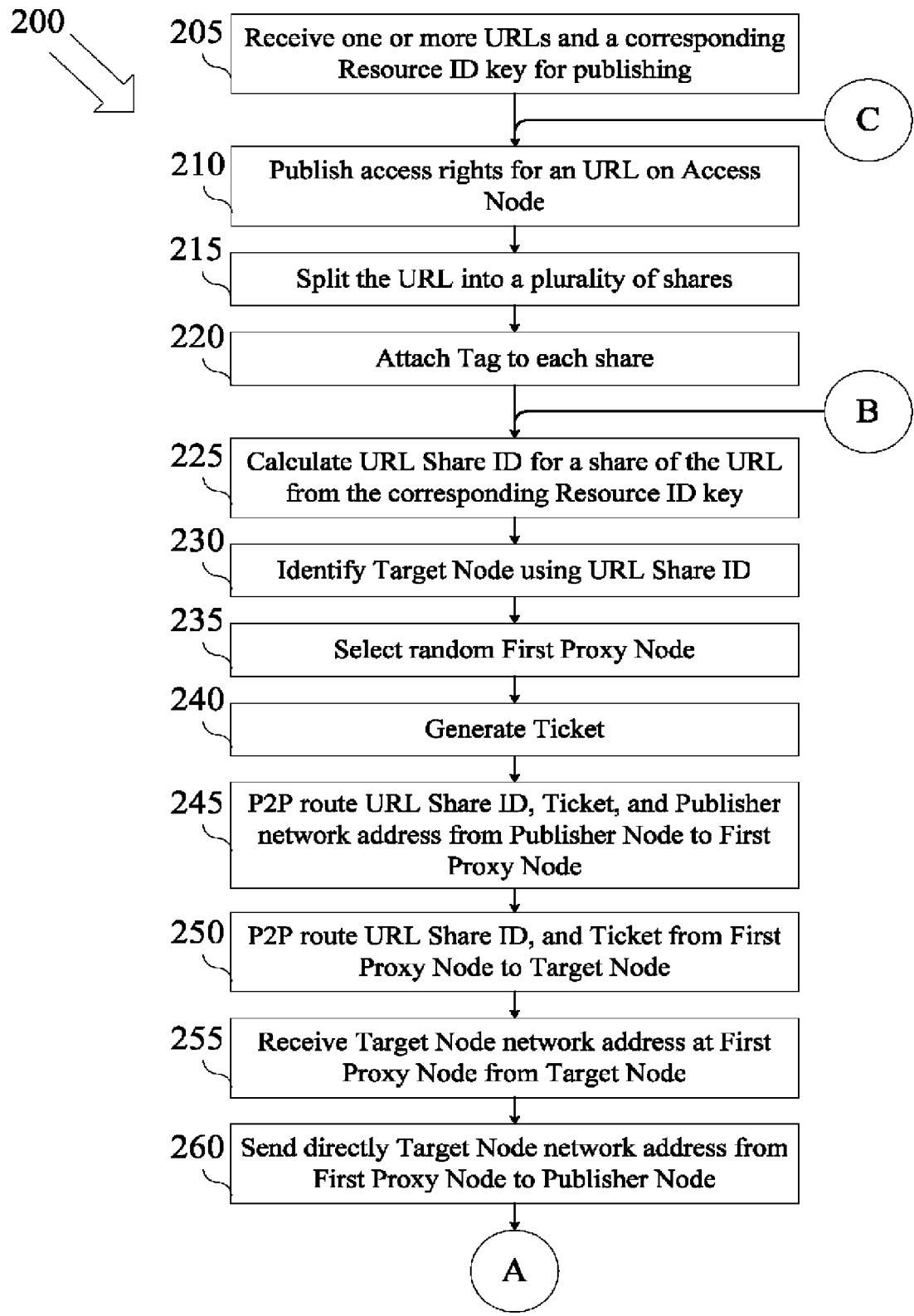
FIG. 2A illustrates a flowchart of a first part of a process to publish a plurality of shares of a plurality of URL references to a plurality of target nodes through a plurality of first proxy nodes and a plurality of second proxy nodes in a P2P ring, according to one embodiment of the invention.

FIG. 2A is a flowchart 200 of a first part of a process to publish a plurality of shares of a plurality of URL references to a plurality of target nodes through a plurality of first proxy nodes and a plurality of second proxy nodes in a P2P ring by a DS provider, according to one embodiment of the invention. Certain operations of the process are represented by boxes with dashed lines to illustrate that they are optional. A target node is allocated by applying P2P routing. A corresponding URL share is sent directly from a publisher node to the target node using network address routing. A number of proxy nodes are used during this process to conceal the network address of the publisher node.

Similarly to the process illustrated with FIG. 1, the secure DS provider operates in a global network and utilizes a plurality of network nodes in a DHT based P2P ring. At block 205, the DS provider receives a resource identification key and one or more corresponding URLs at a publishing node. At block 210, a set of predefined access rules is published on access server, if the access to the entrusted discovery information has to be restricted. The set of rules may be defined separately for every single URL or as a whole for all URLs corresponding to the resource identification key.

At block 215, a predefined number of shares is generated by splitting one of the received URLs. In one embodiment, the shares are generated by applying Shamir secret sharing algorithm. At block 120, a special tag is attached to each share of the split URL to indicate that these shares are from the same URL. This is done when more than one URL corresponds to the resource identification key. Then, at block 225, the DS provider calculates a share identifier for one of the shares of the URL by applying the hash function of the DHT based P2P ring to the resource identification key. Similarly to the process illustrated with FIG. 1, the share identifier is used to identify a corresponding target node in the hash table at block 230.

At block 235, the DS provider selects randomly a first proxy node from the P2P ring of nodes, for example, by applying the underlying hash function to a random value. A ticket to relate the share identifier and the share is generated at block 240. Then, at block 245, the share identifier together with the ticket and the network address of the publisher node are sent to the first proxy node by applying P2P routing protocol. The share identifier and the ticket are forwarded to the target node at block 250 by applying P2P routing protocol. The first proxy node receives the network address of the target node at block 255, and, at block 260, sends it directly to the publisher node by applying direct network address routing. Thus, the network location of the target node is identified by the publisher node.

Figure 2B:
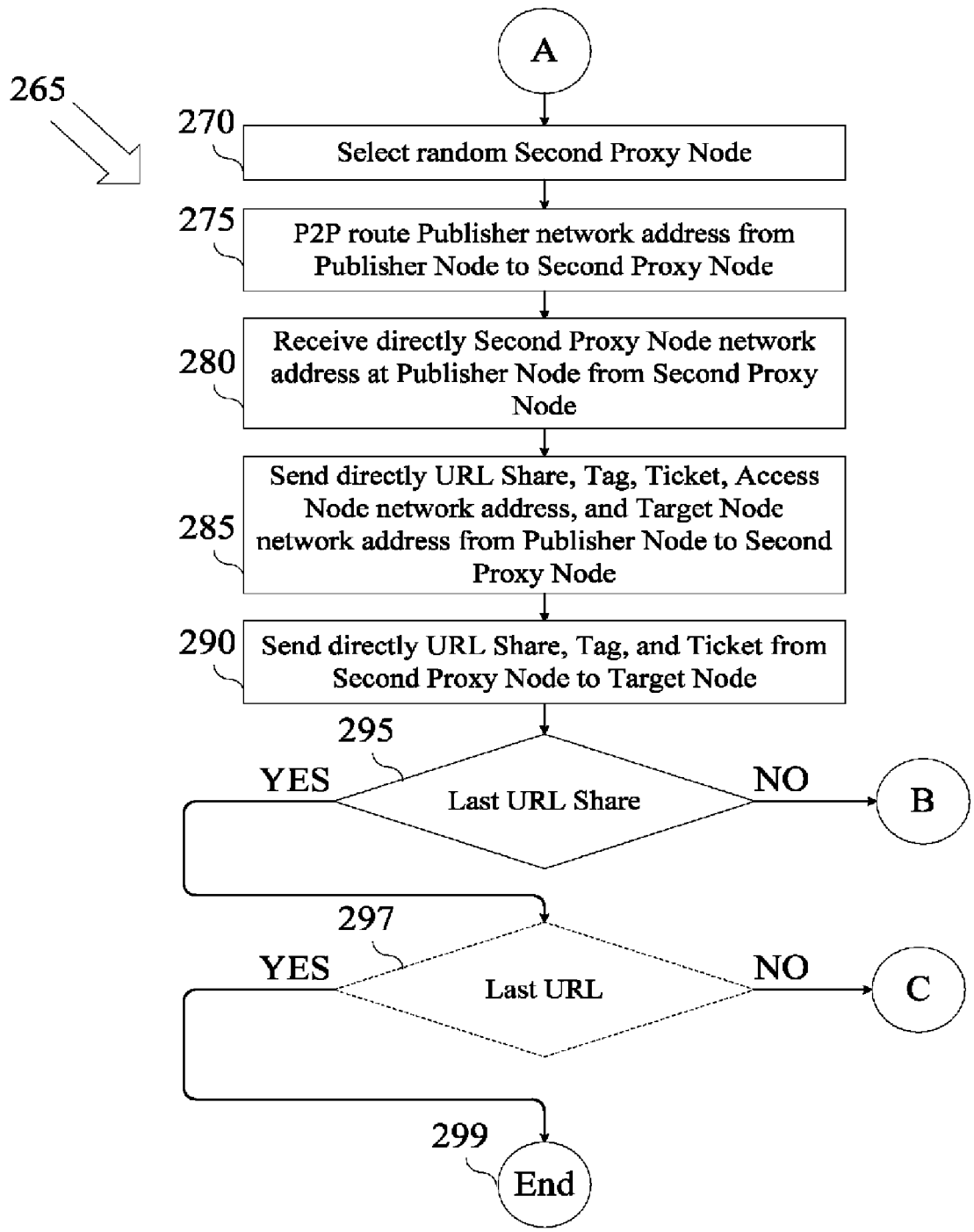
FIG. 2B is a continuation of FIG. 2A and illustrates a flowchart of a second part of a process to publish a plurality of shares of a plurality of URL references to a plurality of target nodes through a plurality of first proxy nodes and a plurality of second proxy nodes in a P2P ring, according to one embodiment of the invention.

FIG. 2B is a flowchart 265 of the second part of the process to publish a plurality of shares of a plurality of URL references to a plurality of target nodes through a plurality of first proxy nodes and a plurality of second proxy nodes. At block 270, the DS provider selects randomly a second proxy node from the P2P ring of nodes. This is done, for example, by applying the underlying hash function to another random value. At block 275, the network address of the publisher node is routed to the second proxy node by applying P2P routing. The network address of the second proxy node is received by applying direct network address routing, as illustrated at block 280.

At block 285, the DS provider sends directly from the publisher node to the second proxy node the network address of the target, and the URL share with the corresponding tag and ticket. At block 290, the URL share and the corresponding tag and ticket are forwarded from the second proxy node to the target node by applying direct network address routing. Thus, the URL share identifier and the URL share are separately published at the target where they can be related by the ticket. The transfer of the URL share doesn't involve P2P routing and the transfer of the URL share identifier doesn't involve network address routing. Thus no other node but the publisher and the target nodes would handle the coupling of URL share and URL share identifier.

Blocks 225 through 290 repeat to store each share of the URL to a separate target node in the P2P ring. The resource identification key is modified each time the hash function is applied in order to receive unique share identifier for each URL share. At block 295, it is determined if there are any shares of the URL left to be published. Blocks 210 through 295 repeat for each URL corresponding to the resource identification key. At block 297, it is determined if there are any such URLs left unpublished. The process ends at block 299 when all shares of all URLs corresponding on the resource identifier are published on a plurality of target nodes in the P2P ring.

Alternatively, instead of repeating the actions of blocks 210 through 295, all received URLs that correspond to a single resource identifier key could be split in a predefined number of shares simultaneously at block 215. Thus a share identifier calculated at block 225 will correspond to a set of shares of different URLs, and a whole set of shares for different URLs will be published to a corresponding target node at block 290. Furthermore, in one embodiment of the invention a sequence of proxy nodes could be used instead of using a single first or a single second proxy.

Figure 3:
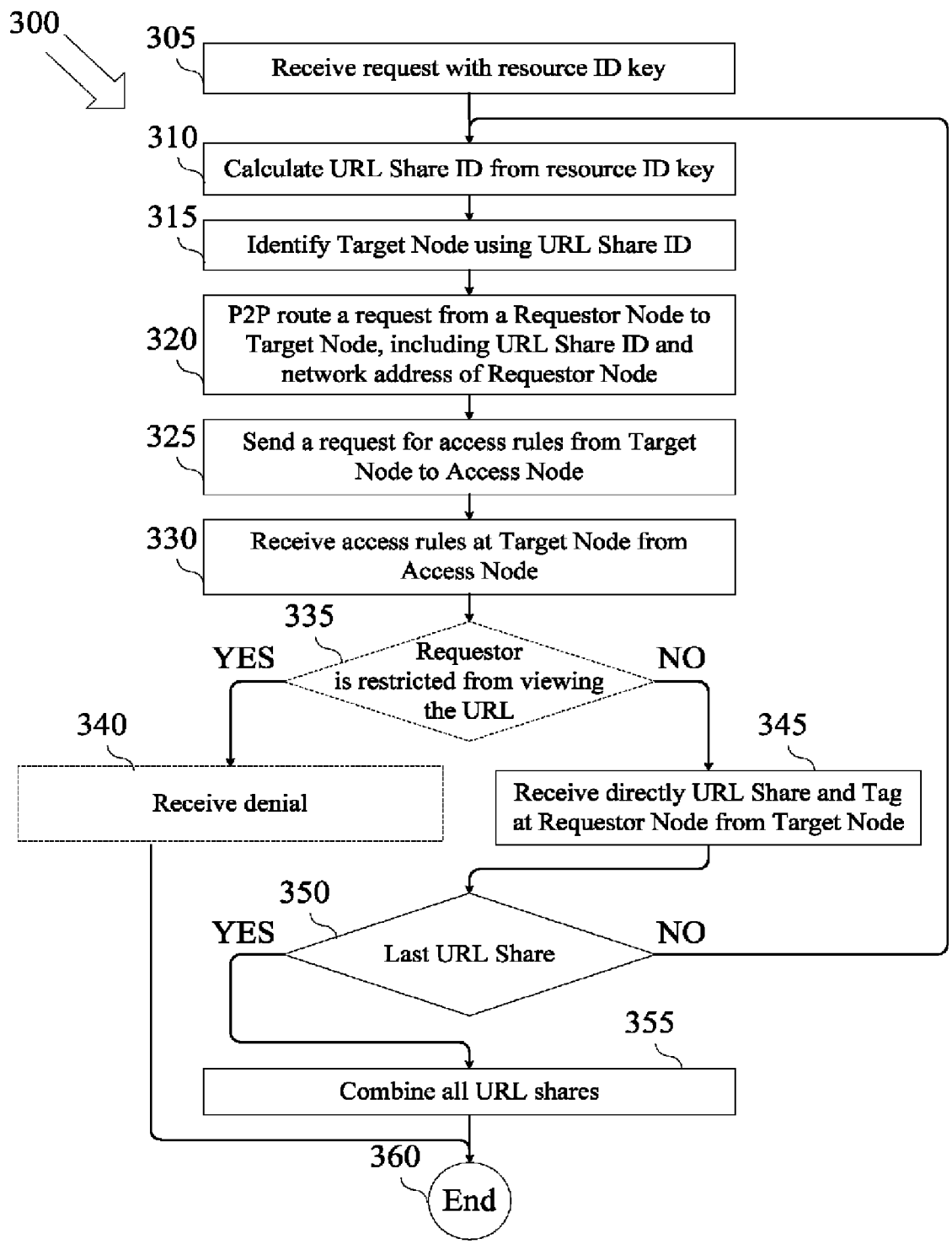
FIG. 3 illustrates a flowchart of a process to read a plurality of shares of a plurality of URL references from a plurality of target nodes in a P2P ring, according to one embodiment of the invention.

FIG. 3 is a flowchart 300 of a process to read a plurality of shares of a plurality of URL references from a plurality of target nodes in a P2P ring by a DS provider, according to one embodiment of the invention. Certain operations of the process are represented by boxes with dashed lines to illustrate that they are optional. The secure DS provider operates in a global network and utilizes a plurality of network nodes in a DHT based P2P ring. At block 305, the DS provider receives a request from a third party to provide one or more URL references at a requestor node in the P2P ring. The request includes a resource identification key.

At block 310, a share identifier is calculated by applying the underlying hash function of the DHT based P2P ring to the resource identification key. At block 315, the share identifier is used to identify a corresponding node in the P2P ring from the hash table. The identified node is the target node where the share identifier and one or more corresponding shares of one or more URLs are published. At block 320, the DS provider sends the share identifier and the network address of the requestor node to the target node by applying P2P routing.

At block 325, a request for access rules regarding the required information is sent from the target node to an access node. The access rules are received at block 330, and, at block 335, it is determined whether the requesting third party has rights to read the URLs corresponding to the resource identification code. At block 340, a denial is received at the requester node from the target node when the requesting party is restricted. When the requesting third party has rights to access the URLs, or when access control is not required, one or more URL shares corresponding to the share identifier are received directly at the requester node from the target node using network address routing. When shares of more than one URL are received, each share is associated with a tag which indicates to what URL the share belongs.

Blocks 305 through 345 repeat to collect all shares of one or more URLs corresponding to the resource identification code. The resource identification key is modified each time the hash function is applied in order to receive the different unique share identifiers for the URL shares. At block 350, it is determined if all shares are collected. Then, at block 355, the shares are assembled in URLs and presented to the requesting third party. The process ends at block 360.

Figure 4:
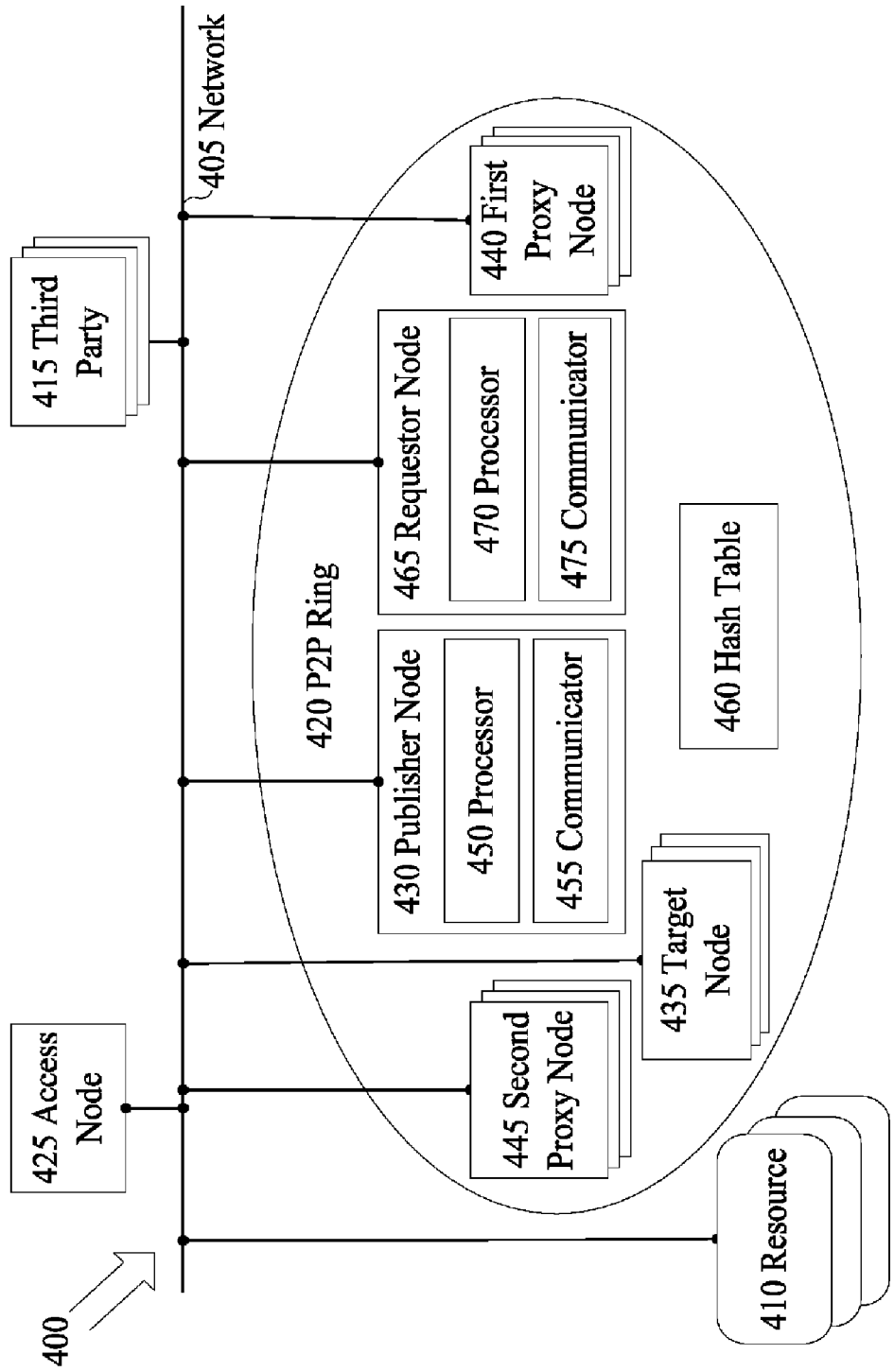
FIG. 4 illustrates a block diagram of a system to provide secure distributed item-level discovery service using secret sharing, according to one embodiment of the invention.

FIG. 4 is a block diagram of system 400 to provide secure distributed item-level discovery service using secret sharing, according to one embodiment of the invention. System 400 comprises Network 405 which is a global public server based computer network of a plurality of nodes. Network 405 comprises a number of Resources 410. System 400 provides URLs to Resources 410 in response of requests of Third Parties 415. On top of Network 405 is built DHT based P2P Ring 420 of nodes to publish the URLs to Resources 410. The requests of Third Parties 415 are served in accordance with access rules stored in Access Node 425.

P2P Ring 420 comprises Publisher Node 430 to publish URL references to a plurality of Target Nodes 435 through a plurality of First Proxy Nodes 440 and a plurality of Second Proxy Nodes 445. The URLs are split in a number of shares and each share is associated with a share identifier. Publisher Node 430 sends a share identifier to Target Node 435 through First Proxy Node 440 by applying P2P routing. Further, Publisher Node 430 sends the corresponding URL share to Target Node 435 through Second Proxy Node 445 by applying direct network address routing. Furthermore, Publisher Node 430 sends access rules for accessing the corresponding URL to Access Node 425.

Publisher Node 430 comprises Processor 450 to split an URL in a plurality of shares and to calculate share identifier for each share of the URL. Publisher Node 430 also includes Communicator 455 to send and receive data using P2P routing and direct network address routing. According to one embodiment of the invention, Processor 430 applies a hash function of DHT based P2P Ring 420 to a resource identification key, associated with the URL. The resource identification key is modified each time the hash function is applied in order to receive unique share identifier for each URL share. Publisher Node 430 uses share identifier to allocate corresponding Target Node 435 in underlying Hash Table 460 of P2P Ring 420.

System 400 further includes Requestor Node 465 to serve requests of Third Parties 415 for providing URL references. Requestor Node 465 comprises Processor 470 to calculate a plurality of share identifiers for a plurality of shares of one or more URLs by applying the hash function of P2P Ring 420 to a resource identification key, received in a request. The resource identification key is modified each time the hash function is applied in order to receive unique share identifier for each URL share. Requestor Node 465 allocates a plurality of Target Nodes 435 in underlying Hash Table 460 of P2P Ring 420 that correspond to calculated share identifiers. There are published the corresponding URL shares.

Requestor Node 465 sends a share identifier to Target Node 435 applying P2P routing and requests the stored corresponding URL shares. Target Node 435 checks whether requesting Third Party 415 has right to read the published URL references, according to the rules in Access Node 425. If yes, Target Node 435 sends the shares of one or more URLs corresponding to the share identifier to Requestor Node 465. With the help of Processor 470, Requestor Node 465 assembles all received shares in valid URLs and reports them to requesting Third Party 415. Requestor Node 465 uses Communicator 475 to send and receive data using P2P routing and direct network address routing. In an alternative embodiment, Access Node 425 could be part of P2P Ring 420.

In the above description numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

What is claimed is:

1. A computer implemented method for publishing information in a network, comprising:
    splitting at a publisher an uniform resource locator (URL) into a plurality of shares, wherein the URL is associated with a resource identification key; and
    for each share of the plurality of shares of the URL:
        calculating a share identifier for a current share of the plurality of shares of the URL based on the resource identification key,
        sending the share identifier to a target node of a plurality of nodes through a first proxy node of the plurality of nodes using peer-to-peer (P2P) routing, wherein the plurality of nodes are included in a P2P ring of the network,
        receiving a network address of the target node from the first proxy node, wherein the network address of the target node is unique address of the target node in the network, and
        sending the current share to the target node through a second proxy node of the plurality of nodes using network address routing.

2. The method of claim 1 further comprising:
    generating a ticket to relate the share identifier and the current share;
    sending the ticket together with the share identifier to the target node through the first proxy node; and
    sending the ticket together with the current share to the target node through the second proxy node.

3. The method of claim 1 further comprising:
    on an access control server, publishing access rules for reading the URL.

4. The method of claim 1, wherein splitting the URL comprises:
    splitting each of a plurality of URLs to a plurality of shares, wherein the plurality of URLs are associated with the resource identification key; and
    assigning a tag to a subset of shares of the plurality of shares to indicate shares that belong to a same URL.

5. The method of claim 1, wherein splitting the URL comprises:
    applying a secret sharing algorithm to split the URL to the plurality of shares.

6. The method of claim 1, wherein calculating the share identifier comprises:
    applying a hash function to the resource identification key.

7. The method of claim 1, wherein sending the share identifier comprises:
    selecting the target node from a distributed hash table defining correspondence between a plurality of share identifiers and the plurality of nodes of the P2P ring in the network.

8. The method of claim 1, wherein receiving the network address of the target node comprises:
    selecting randomly the first proxy node from the plurality of nodes of the P2P ring;
    sending a network address of the publisher to the first proxy node using P2P routing, wherein the network address of the publisher is unique address of the publisher in the network;
    receiving the network address of the target node at the first proxy node; and
    receiving the network address of the target node at the publisher using network address routing.

9. The method of claim 1, wherein sending the current share to the target node through the second proxy node comprises:
    selecting randomly the second proxy node from the plurality of nodes in the P2P ring;
    sending a network address of the publisher to the second proxy node using P2P routing, wherein the network address of the publisher is unique address of the publisher in the network;
    receiving the network address of the second proxy node using network address routing, wherein the network address of the second proxy node is unique address of the second proxy node in the network;
    sending the current share and the network address of the target node to the second proxy node using network address routing; and
    sending the current share from the second proxy node to the target node using network address routing.

10. A computer system to publish information on a network comprising a processor to execute computer instructions to:
- split at a publisher an uniform resource locator (URL) into a plurality of shares, wherein the URL is associated with a resource identification key; and
- for each share of the plurality of shares of the URL to:
  - calculate a share identifier for a current share of the plurality of shares of the URL based on the resource identification key,
  - send the share identifier to a target node of a plurality of nodes through a first proxy node using peer-to-peer (P2P) routing, wherein the first proxy node is randomly selected from the plurality of nodes, and wherein the plurality of nodes are included in a P2P ring of the network,
  - receive a network address of the target node from the first proxy node, wherein the network address of the target node is unique address of the target node in the network, and
  - send the current share to the target node through a second proxy node using network address routing, wherein the second proxy node is randomly selected from the plurality of nodes.

11. The computer system of claim 10 comprising the processor to execute further computer instructions to:
- generate a ticket to relate the share identifier and the current share;
- send the ticket together with the share identifier to the target node through the first proxy node; and
- send the ticket together with the current share to the target node through the second proxy node.

12. The computer system of claim 10 comprising the processor to execute further computer instructions to:
- on an access control server, publish access rules for reading the URL.

13. The computer system of claim 10, wherein splitting the URL comprises:
- splitting each of a plurality of URLs to a plurality of shares, wherein the plurality of URLs are associated with the resource identification key; and
- assigning a tag to a subset of shares of the plurality of shares to indicate shares that belong to a same URL.

14. The computer system of claim 10, wherein splitting the URL comprises:
- applying a secret sharing algorithm to split the URL to the plurality of shares.

15. The computer system of claim 10, wherein calculating the share identifier comprises:
- applying a hash function to the resource identification key.

16. The computer system of claim 10, wherein sending the share identifier comprises:
- selecting the target node from a distributed hash table defining correspondence between a plurality of share identifiers and the plurality of nodes of the P2P ring in the network.

17. The computer system of claim 10, wherein receiving the network address of the target node comprises:
- sending a network address of the publisher to the first proxy node using P2P routing, wherein the network address of the publisher is unique address of the publisher in the network;
- receiving the network address of the target node at the first proxy node; and
- receiving the network address of the target node at the publisher using network address routing.

18. The computer system of claim 10, wherein sending the current share to the target node through the second proxy node comprises:
- sending a network address of the publisher to the second proxy node using P2P routing, wherein the network address of the publisher is unique address of the publisher in the network;
- receiving the network address of the second proxy node using network address routing, wherein the network address of the second proxy node is unique address of the second proxy node in the network;
- sending the current share and the network address of the target node to the second proxy node using network address routing; and
- sending the current share from the second proxy node to the target node using network address routing.

* * * * *